J. F. BRAUCHER.
Plow and Harrow.
No. 107,862.
Patented Oct. 4, 1870.
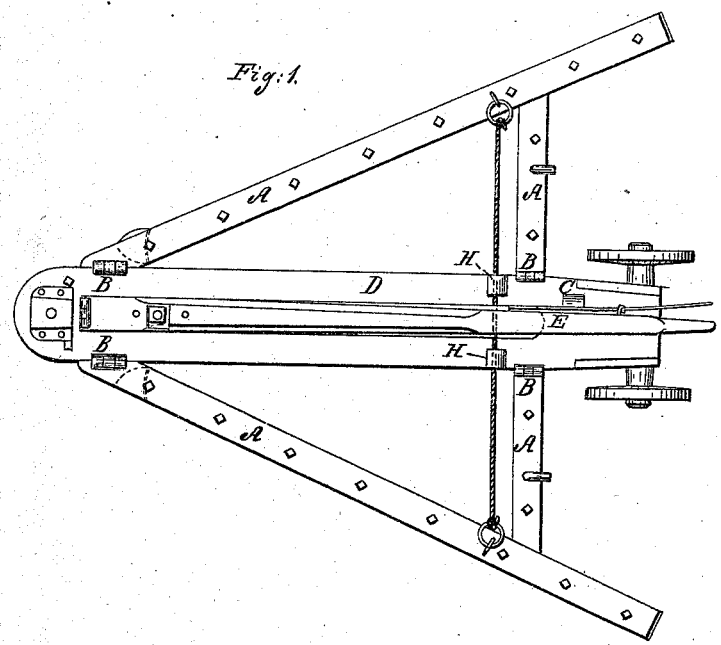
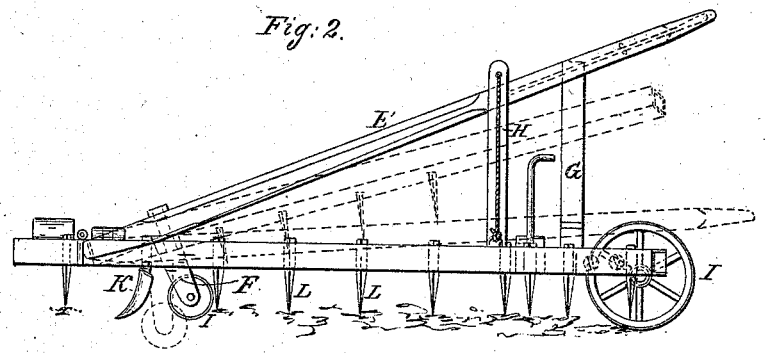

UNITED STATES PATENT OFFICE.

JAMES F. BRAUCHER, OF LINCOLN, ILLINOIS.

IMPROVEMENT IN COMBINED PLOWS AND HARROWS.

Specification forming part of Letters Patent No. 107,862, dated October 4, 1870.

*To all whom it may concern:*

Be it known that I, JAMES F. BRAUCHER, of Lincoln, in the county of Logan and State of Illinois, have invented a new and Improved Combination Plow, Harrow, and Corn or Grain Marker; and I do hereby declare that the following is a full and exact description thereof, reference being had to the accompanying drawing, and to the letters of reference marked thereon.

The nature of my invention consists in having combined in one machine the plow, (commonly used for plowing corn or other grain,) the harrow, and a marker, (commonly used for marking out rows for planting corn or other grain,) the machine being constructed with two hind wheels, upon which rests the center or main part of said machine, the two hind wheels being eight feet apart, the wheel on the lever on the front part of said machine being so constructed and placed that said wheel, in connection with the two hind wheels, when in use, marks out rows for planting just four feet apart, which is the desired distance for planting; that the ground is harrowed at the same time by the same machine, team, and person, thus economizing time, labor, and expense; also, in the manner in which my harrow is attached to the main or center part of said machine, it being so constructed that it can be raised or lowered at will either on one side or on both; also, in the lever with which the harrow is raised or lowered; also, in the wheel and the manner in which the same is attached to the lever; also, in the manner in which the shovels or plows are attached, it being so arranged that they can be taken out and teeth substituted, if desired; also, in the attachment of a handle to either harrow, so that the same can be lowered or raised at will; also, in the general design and combination of the several parts into one machine.

What I claim as my invention, and desire to secure by Letters Patent, is—

The arrangement, in a combined plow, harrow, and marker, of the central frame, D, wings A, axle-tree G, wheels I I I, forked standard F, posts H H and C, lever E, shovels K K, and teeth L, operating as described.

JAMES F. BRAUCHER.

Witnesses:
    FRANK GERARD,
    JAMES BRAUCHER.